United States Patent [19]

Takekoshi et al.

[11] Patent Number: 4,906,730
[45] Date of Patent: Mar. 6, 1990

[54] POLYETHERIMIDE BLENDS, AND MOLDING METHOD

[75] Inventors: Tohru Takekoshi, Scotia, N.Y.; Patricia P. Anderson, Pittsfield, Mass.

[73] Assignee: General Electric Company, Schenectady, N.Y.

[21] Appl. No.: 190,921

[22] Filed: May 6, 1988

[51] Int. Cl.$^4$ .............................................. C08G 69/26
[52] U.S. Cl. .................................... 528/353; 528/125; 528/127; 528/128; 528/171; 528/185; 528/189; 528/352
[58] Field of Search ............... 528/353, 352, 189, 185, 528/171, 125, 127, 128

[56] References Cited

U.S. PATENT DOCUMENTS

| | | | |
|---|---|---|---|
| 4,526,838 | 7/1985 | Fujioka et al. | 528/170 |
| 4,578,470 | 3/1986 | Webb | 548/193 |
| 4,599,396 | 7/1986 | Takekoshi et al. | 528/185 |

FOREIGN PATENT DOCUMENTS

EP247427A 12/1987 European Pat. Off. .
EP247475A 12/1987 European Pat. Off. .

OTHER PUBLICATIONS

Sharples, Allan, "Introduction to Polymer Crystallization", Edward Arnold Publishers, London (1966) pp. 65-76.

Primary Examiner—John Kight
Assistant Examiner—M. L. Moore
Attorney, Agent, or Firm—William A. Teoli; Davis, Jr. James C.; William H. Pittman

[57] ABSTRACT

A method is provided for enhancing the crystallization rate of certain polyetherimide to provide an improved molding mehod for making solvent resistant shaped thermoplastics. Polyetherimide blends containing crystallization rate enhancing agents such as bisimides or imide oligomers also are provided.

8 Claims, No Drawings

POLYETHERIMIDE BLENDS, AND MOLDING METHOD

BACKGROUND OF THE INVENTION

The present invention relates to a method for molding certain aromatic polyetherimides to enhance their rate of crystallization and to the compositions used in such method.

Prior to the present invention, as shown by Allan Sharpless, *Introduction to Polymer Crystallization*, London, Edward Arnold Publishers Ltd. (1966) pgs. 64–76, it was generally known that crystallization of certain polymers such as polyethylene could occur using various nucleating agents to modify the final orientation of physical ordering of the polymer after it was subjected to crystallization conditions. As shown by U.S. Pat. No. 4,599,396, Takekoshi et al., crystalline polyimides can be made exhibiting superior solvent resistance after being molded in various structural, decorative, and protective applications. Although the polyetherimides of Takekoshi et al. have been found to possess many desirable characteristics, their use has been somewhat restricted because they cannot be economically fabricated due to their slow crystallization rate, such as 20 minutes or more, when annealed within their optimum crystallization range.

It would be desirable, therefore, to be able to enhance the crystallization rate of polyetherimides having equilibrium melting points below 400° C. to be able to produce shaped articles exhibiting a high degree of solvent resistance in a more economic manner.

The present invention is based on the discovery that polyetherimides consisting essentially of at least 30 chemically combined repeating groups of the formula,

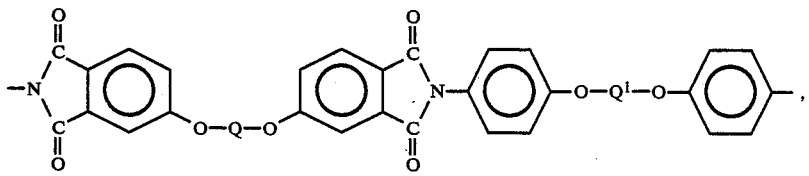

can be injection molded to the crystalline state in substantially less time, if the polyetherimide is blended prior to molding with an effective amount of an aromatic imide or aromatic imide oligomer, as defined hereinafter, where Q and $Q^1$ are the same or different divalent aromatic groups having the formula,

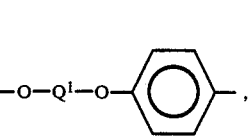

where J is oxygen or sulfur, and n and m are sesparately O or 1.

STATEMENT OF THE INVENTION

There is provided by the present invention, molding compositions comprising polyetherimides consisting essentially of chemically combined groups of formula (1) and an effective amount of a crystallization rate enhancing agent selected from the class consisting of aromatic imides and aromatic imide oligomers.

The aromatic polyetherimides consisting essentially of chemically combined groups of formula (1) can be made by the condensation under melt or in solution of substantially equal molar amounts of aromatic biasanhydrides of the formula,

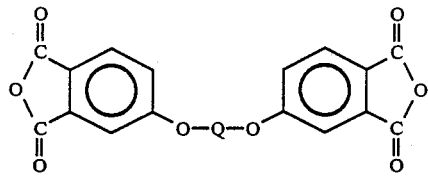

and aromatic biasmines of the formula,

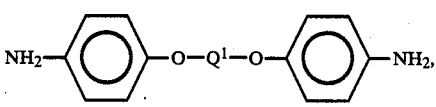

where Q and $Q^1$ are as previously defined. Methods for making some of the polyetherimides are shown in U.S. Pat. No. 4,599,396, assigned to the same assignee as the present invention and incorporated herein by reference. Among the aromatic bis(etheranhydride)s of formula (3), there are included 1,3-bis(3,4-dicarboxyphenoxy)-benzene dianhydride, 1,4-bis(3,4-dicarboxyphenoxy)-benzene dianhydride, 4,4'-bis(3,4-dicarboxyphenoxy)-biphenyl dianhydride, 4,4'-bis(3,4-dicarobxyphenoxy)-diphenyl ether dianhydride, and 4,4'-bis(3,4dicarboxyphenoxy)diphenyl sulfide dianhydride.

Among the aromatic bis(etheramine)s of formula (4), there are included 1,3-bis(4-aminophenoxy)benzene, 1,4-bis(4-aminophenoxy)benzene, 4,4'-bis(4-aminophenoxy)biphenyl, 4,4'-bis(4-aminophenoxy)diphenyl ether, and 4,4-bis(4-aminophenoxy)diphenyl sulfide.

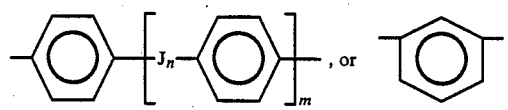

Among the agents which are effective for inducing melt crystallization of the polyetherimides of formula (1), there are included bisimides having the formulas,

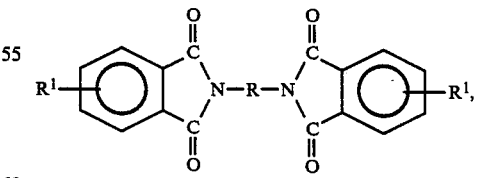

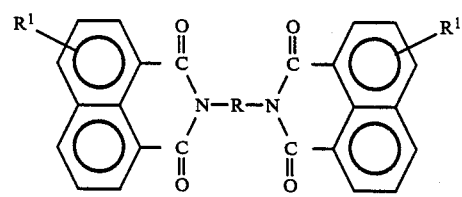

-continued

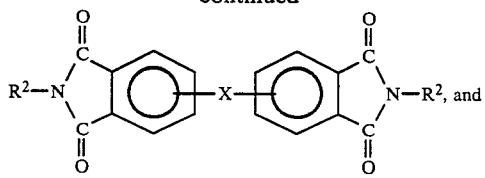

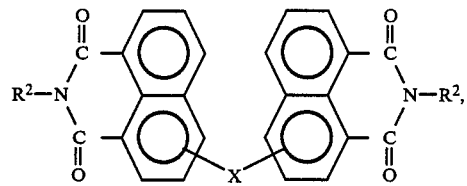

where R is a C(6-13) divalent aryl radical, R¹ and R² are hydrogen, halogen and monovalent radicals selected from the same or different C(1-13) monovalent organic radicals, and C(1-3) monovalent organic radicals substituted with radicals inert during intercondensation, and X is a divalent radical selected from —ORO—, O, S,

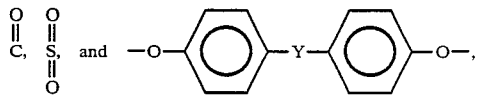

where Y is a direct bond, O, S,

and $C_yH_{2y}$, and y is a whole number equal to 1 to 5 inclusive.

Some of the bisimides included by the above formulas are, for example,

| | m.p. (°C.) |
|---|---|
| 1,4-Bis(phthalimido)benzene | 368 |
| 1,3-Bis(phthalimido)benzene | 324 |
| 1,3-Bis(4-chlorophthalimido)benzene | 313 |
| 1,3-Bis[4-(4-chlorophenoxy)phthalimido]benzene | 256 |
| 1,4-Bis(N—phenylphthalimido-4-oxy)benzene | 363 |

| | m.p. (°C.) |
|---|---|
| 3,3',4,4'-Tetracarboxydiphenylsulfide bis(N—phenyl)imide | 306 |
| 3,3',4,4'-Tetracarboxybenzophenone bistoluimide | 361 |

Additional bisimides included by the above formulae are described by T. Takekoshi (J. Polym. Sci., Polym. Chem. Ed., 23, 1759 (1985)) incorporated herein by reference.

In addition to the above-described bisimides, effective crystallization accelerators for polyetherimides consisting essentially of chemically combined repeating units of formula (1), there are oligomers consisting essentially of from about one to about nine chemically combined units of formula (1) and chain terminated with phthalimide units.

The above-described oligomers can be readily distinguished from the polyetherimide of the present invention shown by formula (1) which have at least 30 chemically combined groups of formula (1) and as high as 100 depending upon the amount of chain stopper used to make the polymer.

The molding compositions of the present invention can be made by melt blending an effective amount of the imide for inducing melt crystallization of the polyetherimide with the polyetherimide by use of an extruder or a Brabender mixer. Blending of the bisimide or imide oligomer with the polyetherimide can be achieved at temperatures in the range of from 250° to 450° C. under conditions of high shear or agitation for 2 to 60 minutes. The crystallization rate of the blended samples can be determined by DSC. An effective amount of the crystallization enhancing agent, whether it be in the form of the bisimide or the imide oligomer, has been found to be of 1 part to 10 parts by weight of the crystallization enhancing agent per 100 parts of the polyetherimide, and preferably from 3 to 5 parts of crystallization enhancing agent per 100 parts of the polyetherimide.

In order that those skilled in the art will be better able to practice the present invention, the following examples are given by way of illustration and not by way of limitation. All parts are by weight.

EXAMPLE 1

A mixture was stirred under nitrogen at a temperature of 200° C. over a period of 3 hours consisting of 119.21 grams (0.2963 mole) of 1,4-bis(3,4-dicarboxyphenoxy)benzene dianhydride, 88.85 grams (0.3039 mole) of 1,3-bis-(4-aminophenoxy)benzene, 2.25 grams (0.0152 mole) of phthalic anhydride, and 771 ml of meta-cresol. During the heating period, water was continuously distilled off. The resulting solution was further heated at 200° C. for an additional 3.5 hours. Heating was terminated and 750 ml of orthodichlorobenzene was added. The solution was cooled to approximately 120° C., a mixture of 100 ml of ortho-dichlorobenzene, and 100 ml of methanol was added drop-wise, followed by addition of 350 ml of methanol. This particular polymer was filtered, washed with methanol, and dried under vacuum under 140° C. Based on method of preparation, there was obtained a polyetherimide consisting essentially of about 40 chemically combined units as shown by formula (1).

A mixture was stirred under nitrogen and heated at 190°-200° C. for 6.5 hours consisting of 14.813 grams (36.82 millimole) of 1,4-bis(3,4-dicarboxyphenoxy)benzene dianhydride, 13.456 grams (46.02 millimole) of 1,3-bis(4-aminophenoxy)benzene, 2.727 grams (18.41 millimole) of phthalic anhydride, and 53 mol of m-cresol. During the heating period, water was continuously distilled off. On cooling, the product precipitated which formed a semisolid cake. It was dispersed in methanol with the aid of a blender. The solid was filtered and redispersed into fresh methanol and allowed to stand for about 12 hours. The product was then filtered and dried under vacuume at 140° C.. There was obtained a 97.3% yield of an oligomer in the form of a tan powder. It had a $T_g$ of 160° C. ad a $T_m$ of 325° C.. Based on method of preparation, the product was a oligoetherimide consisting essentially of an average of about 4 chemically combined etherimide units within the scope of formula (1). The same procedure was repeated except that the amount of chain stopper was adjusted to provide oligomer having an average of from about 1 to about 9 chemically combined repeat units with terminal phthalamide chain stopping units.

A series of blends was prepared consisting of 24 grams of the polyetherimide and 1 gram of the imide oligomer. The ingreidnets were added into a Brabender mixing bowl which was maintained at 360° C. The resulting polymer melt was mixed for 10 minutes at a rate of 10 rpm. A blend was removed from the bowl and allowed to cool to room temperature.

Crystallization rate studies were preformed on various blends prepared from the polyetherimide and oligomer. Approximately 15-20 milligram samples were heated at a rate of 150° C./minute to 360° C. on a Perkin Elmer DSC apparatus. The temperature was maintained at 360 for 1 minute to ensure complete melting and then cooled at a rate of 150° C./minute to a given annealing temperature. After holding at the annealing temperature for a specified time, the sample was quenched by cooling at 150° C./minute to 30° C. The quenched sample was then scanned at a heating rate of 60°/minute to obtain crystal melting endotherms for the respective samples. The following results are shown below in Table I:

imide oligomer blends of the present invention as compared to the polyetherimide of the prior art.

An additional study was made with respect to the effect of annealing temperatures and the size of the imide oligomer relative to its efficiency of crystallization as shown in Table II:

TABLE I

Crystallization of Polyetherimide Samples Containing 4 wt. % of Oligomers at an Annealing Temperature of 280° C.

| Oligomer Additive* (4 wt. %) | Tg (°C.) | Crystal Melting Endotherm $\Delta H_m$ (joule/g) After Annealing at 280° C. For | | | | | |
|---|---|---|---|---|---|---|---|
| | | 1 min. | 3 min. | 5 min. | 10 min. | 15 min. | 20 min. |
| n = 0 | 195 | — | 0.42 | 5.60 | 14.38 | | 17.31 |
| n = 1 | 197 | 0.16 | 5.03 | 10.07 | 17.75 | | 18.37 |
| n = 2 | 200 | 1.87 | 11.14 | 15.28 | 16.98 | | 17.31 |
| n = 4 | 201 | — | 7.96 | 18.13 | 17.72 | 18.50 | 18.75 |
| n = 9 | 203 | — | 6.96 | 2.93 | 7.78 | 13.64 | 20.27 |
| n = 40 (Neat Polymer) | 201 | — | — | 1.46 | 6.71 | 12.80 | 18.67 |

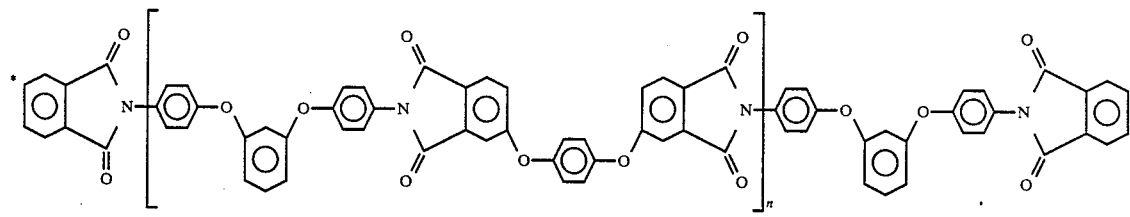

TABLE II

Effect of Annealing Temperatures on Crystallization of Polyetherimide Containing Oligomer Additive

| Annealing Condition | Crystal Melting Endotherm $\Delta H_m$ (joule/g) | | |
|---|---|---|---|
| | Oligomer Additive* n = 4 | Oligomer Additive n = 9 | Neat n = 40 |
| 260°/10 min. | 13.18 | 0.94 | 1.89 |
| 270°/10 min. | 17.78 | 4.69 | 4.49 |
| 280°/10 min. | 17.72 | 7.78 | 6.71 |
| 290°/10 min. | 16.88 | 8.83 | 4.53 |

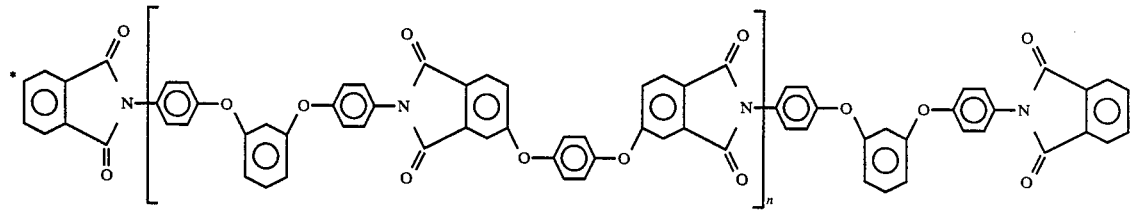

The above results show that the Tg's of the various blends were substantially the same as the polyetherimide where n is equal to 40. However, the blends exhibited substantially complete crystallization (n=4) after annealing only 5 minutes at 280° C. as compared to 20 minutes for the polyetherimide free of imide oligomer. As a result, fabrication of crystallized polyetherimide would be significantly more economic by utilizing the

EXAMPLE 2

In accordance with the procedure of Example 1, additional blends were prepared utilizing imides as crystallization accelerators for the polyetherimide. The bisimides utilized as crystallization accelerators are shown in Table III:

TABLE III

Bisimide Type Additives for Enhancement of Polyetherimide Crystallization

| Compound | Structure | m.p. (°C.) |
|---|---|---|
| A | | 363 |

TABLE III-continued
Bisimide Type Additives for Enhancement of Polyetherimide Crystallization

| Compound | Structure | m.p. (°C.) |
|---|---|---|
| B | (CH₃-phenyl-N-bisimide-phenyl-CH₃ structure) | 360–361 |
| C | (phthalimide-phenyl-phthalimide structure) | 367–369 |

In accordance with the procedure of Example 1, the above bisimides were evaluated as crystallization enhancing additives at 280° C.. The results are shown in Table IV:

TABLE IV

Crystal Melting Endotherm Δ Hm (Joule/g) After Annealing at 280° For

| Sample | 1 Min. | 3 Min. | 5 Min. | 10 Min. | 15 Min. | 20 Min. |
|---|---|---|---|---|---|---|
| Neat | — | — | 1.46 | 6.71 | 12.80 | 18.67 |
| +2% A* | — | 1.49 | 3.19 | 18.12 | 16.23 | |
| +4% A | 1.40 | 11.94 | 15.53 | 18.02 | 17.47 | |
| +6% A | — | 2.61 | 6.56 | 18.55 | 15.14 | |
| +4% TiO₂ | 11.33 | 15.27 | 18.00 | 18.27 | 17.11 | |

*See additive A in Table III

The above results show that the bisimide blend experiences crystallization about twice as fast as the polyetherimide free of the bisimide as shown by the crystal melting endotherm at 280° C. over a range of 2% to 6% of the bisimide by weight.

An additional study was made with other bisimides as shown in Table V:

TABLE V
Crystallization of Polyetherimides at Various Annealing Temperatures

| | | Crystal Melting Endotherm Δ Hm (Joule/g) After Various Annealing Conditions | | | | |
|---|---|---|---|---|---|---|
| Sample | Tg (°C.) | 250° C./10 min | 260° C./10 min | 270° C./10 min | 280° C./10 min | 290° C./10 min |
| Neat | 200 | 0.46 | 1.89 | 4.49 | 6.71 | 4.53 |
| +2% A* | 197 | 0.16 | 3.23 | 9.98 | 17.21 | 17.58 |
| +4% A | 192 | 3.44 | 14.95 | 17.46 | 18.05 | 17.66 |
| +6% A | 188 | 0.85 | 6.74 | 14.19 | 18.55 | 8.07 |
| +4% B* | 194 | 0.93 | 3.37 | 9.60 | 11.76 | 12.96 |
| +4% C* | 200 | — | — | 13.22 | 11.94 | 17.61 |
| +5% TiO₂ | 198 | 4.41 | 19.87 | 19.22 | 18.28 | 20.02 |

*Refer to Table III

The above results show that the bisimides B and C are less effective as crystallization accelerators than bisimide A, while an inorganic accelerator, such as TiO₂, was also quite effective. It was found, however, that the TiO₂ resulted in white opaque crystalline polyetherimide which coul restrict its use in particular applications.

Although the above examples are directed to only a few of the very many variables which can be used in the practice of the present invention, it should be understood that the present invention is directed to a much broader variety of polyetherimides and imide oligomers and bisimides as shown in the description preceding these examples.

What is claimed and sought to be proteced by Letters Patent of the United States is as follows:

1. Molding compositions comprising polyetherimides consisting essentially of chemically combined groups of the formula

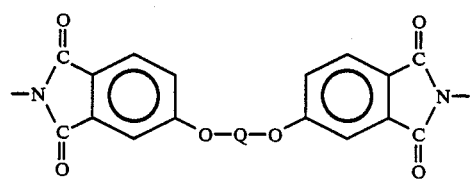

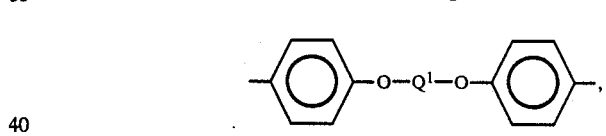

and an effective amount of a crystallization rate enhancing agent where Q and Q¹ are the same or different divalent aromatic groups having the formula,

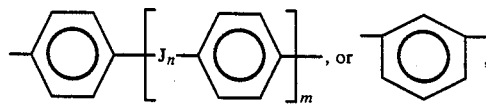

where J is oxygen or sulfur, and n and m are separately 0 or 1.

2. A molding composition in accordance with claim 1, wherein the crystallization rate enhancing agent is TiO$_2$.

3. A molding composition in accordance with claim 1, where the crystallization rate enhancing agent is a bisimide.

4. A molding composition in accordnce with claim 1, where the crystallization rate enhancing agent is an imide oligomer.

5. A method for enhancing the rate of crystallization of a polyetherimide consisting essentially of chemically combined units of the formula

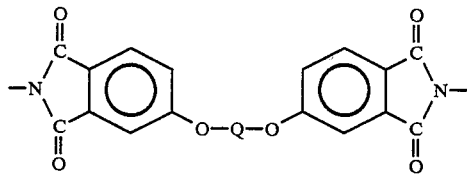

-continued

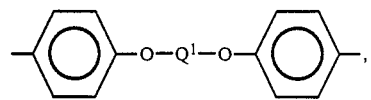

which comprises
(1) molding at the temperature of from 250° C. to 450° C., a mixture comprising a polyetherimide, an effective amount of a crystallization rate enhancing agent, and
(2) recovering a crystalline polyetherimide article from step (1),
where Q and Q$^1$ are the same or different divalent aromatic groups having the formula,

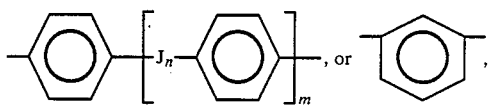

where J is oxygen or sulfur, and n and m are separately 0 or 1.

6. A method in accordance with claim 5, wherein the crystallization rate enhancing agent is TiO$_2$.

7. A method in accordance with claim 5, where the crystallization rate enhancing agent is a bisimide.

8. A method in accordance with claim 5, where the crystallization rate enhancing agent is an imide oligomer.

* * * * *